United States Patent
Tooher et al.

(10) Patent No.: US 12,532,351 B2
(45) Date of Patent: Jan. 20, 2026

(54) METHODS FOR WIDEBAND UNLICENSED CHANNEL ACCESS

(71) Applicant: INTERDIGITAL PATENT HOLDINGS, INC., Wilmington, DE (US)

(72) Inventors: J. Patrick Tooher, Montreal (CA); Oghenekome Oteri, San Diego, CA (US); Aata El Hamss, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 563 days.

(21) Appl. No.: 17/441,765

(22) PCT Filed: Mar. 27, 2020

(86) PCT No.: PCT/US2020/025327
§ 371 (c)(1),
(2) Date: Sep. 22, 2021

(87) PCT Pub. No.: WO2020/198623
PCT Pub. Date: Oct. 1, 2020

(65) Prior Publication Data
US 2022/0201747 A1     Jun. 23, 2022

Related U.S. Application Data

(60) Provisional application No. 62/824,799, filed on Mar. 27, 2019.

(51) Int. Cl.
*H04W 74/0808*     (2024.01)
*H04L 5/00*     (2006.01)

(52) U.S. Cl.
CPC ....... *H04W 74/0808* (2013.01); *H04L 5/0007* (2013.01); *H04L 5/0051* (2013.01)

(58) Field of Classification Search
CPC ......... H04W 74/0808; H04W 72/0453; H04W 74/004; H04L 5/0007; H04L 5/0051
See application file for complete search history.

(56) References Cited

U.S. PATENT DOCUMENTS 10,159,089 B2    12/2018    Luo et al.
2018/0352537 A1    12/2018    Zhang et al.
(Continued)

FOREIGN PATENT DOCUMENTS

EP     3641441 A1     4/2020

OTHER PUBLICATIONS

IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2016 (Dec. 7, 2016).
(Continued)

*Primary Examiner* — Sharmin Chowdhury
(74) *Attorney, Agent, or Firm* — VOLPE KOENIG

(57) ABSTRACT

Systems, methods, and devices for addressing wideband unlicensed channel access are disclosed herein. A device may be configured for different types of listen-before-talk (LBT) procedures, where the LBT type may refer to the frequency granularity of the LBT. There may be a hierarchical LBT procedure, where the LBT granularity changes at each point in the LBT procedure. There may be a selection of parameters for each LBT type. Some of the parameters may be shared over different points of the LBT procedure. There may be LBT subband sets for a subband set LBT type. There may be one or more indications of acquired LBT subbands on a condition of shared channel occupancy time. At one point in the LBT procedure, there may be a selection (Continued)

of a LBT subband or one or more subbands sets for transmission based on one or more criteria.

15 Claims, 13 Drawing Sheets

(56) References Cited

U.S. PATENT DOCUMENTS

| | | | |
|---|---|---|---|
| 2018/0376460 A1* | 12/2018 | Atefi | H04L 69/22 |
| 2019/0132882 A1* | 5/2019 | Li | H04W 74/0833 |
| 2019/0215217 A1* | 7/2019 | Kim | H04L 5/0048 |
| 2019/0230706 A1* | 7/2019 | Li | H04B 7/0639 |
| 2020/0120720 A1 | 4/2020 | Wu et al. | |
| 2021/0235492 A1* | 7/2021 | Iyer | H04W 72/23 |
| 2021/0344453 A1* | 11/2021 | Lei | H04L 1/1819 |
| 2021/0378013 A1* | 12/2021 | Jiang | H04L 27/0006 |

OTHER PUBLICATIONS

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHz, IEEE Std 802.11ac-2013 (Dec. 11, 2013).

IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).

IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE 802.11ah-2016 (Dec. 7, 2016).

Interdigital, Inc., "Channel access in NR-U," 3GPP TSG RAN WG1 #96bis, R1-1904853, Xi'an, China (Apr. 8-12, 2019).

Interdigital, Inc., "Channel access in NR-U," 3GPP TSG RAN WG1 #97, R1-1906762, Reno, USA (May 13-17, 2019).

Nokia, "New WID on 410-430 MHz E-UTRA FDD Band(s) for LTE PPDR and PMR/PAMR in Europe," 3GPP TSG RAN Meeting #82, RP-182898, Sorrento, Italy (Dec. 10-13, 2018).

Qualcomm Inc., "New WID on NR-based Access to Unlicensed Spectrum," 3GPP TSG RAN Meeting #82, RP-182878, Sorrento, Italy (Dec. 10-13, 2018).

TCL Communication, "Wideband carrier usage for NR-U," 3GPP TSG RAN WG1 Meeting #96, R1-1902544, Athens, Greece (Feb. 25-Mar. 1, 2019).

Third Generation Partnership Project, "Technical Specification Group Radio Access Network; NR; Physical layer procedures for control (Release 15)," 3GPP TS 38.213 V15.3.0 (Sep. 2018).

Third Generation Partnership Project, "Technical Specification Group Radio Access Network; NR; Physical layer procedures for control (Release 15)," 3GPP TS 38.213 V15.4.0 (Dec. 2018).

Third Generation Partnership Project, "Technical Specification Group Radio Access Network; NR; Physical layer procedures for control (Release 15)," 3GPP TS 38.213 V15.8.0 (Dec. 2019).

Third Generation Partnership Project, "Technical Specification Group Radio Access Network; NR; Physical layer procedures for control (Release 15)," 3GPP TS 38.213 V16.0.0 (Dec. 2019).

Third Generation Partnership Project, "Technical Specification Group Radio Access Network; Study on NR-based access to unlicensed spectrum (Release 16)," 3GPP TR 38.889 V16.0.0 (Dec. 2018).

Vivo, "Discussion on the channel access procedures," 3GPP TSG RAN WG1 Meeting #94, R1-1808237, Gothenburg, Sweden (Aug. 20-24, 2018).

* cited by examiner

METHODS FOR WIDEBAND UNLICENSED CHANNEL ACCESS

CROSS-REFERENCE TO RELATED APPLICATIONS

This application is the U.S. National Stage, under 35 U.S.C. § 371, of International Application No. PCT/US2020/025327 filed Mar. 27, 2020, which claims the benefit of U.S. Provisional Application No. 62/824,799 filed Mar. 27, 2019, the contents of which are incorporated herein by reference.

BACKGROUND

Using large bandwidths in new radio in unlicensed bands (NR-U) is beneficial because it ensures that large transmissions take place in short amounts of time. This, in turn, reduces the impact of failing to acquire a channel due to listen-before-talk (LBT) not being successful in the allotted time. LBT may be done in portions of at least 20 MHz. If the LBT process is defined to only be performed on LBT subbands, multiple LBT processes would need to be performed to acquire a large bandwidth (BW). This may increase channel access complexity. For example, it is unclear how many LBT processes can be performed in parallel. Using a wideband LBT process may reduce the undue complexity. However, a wideband LBT process may fail for the entire BW or bandwidth part (BWP) when only a small portion of the BW is actually occupied. Therefore, adaptability between these two extreme examples is required to benefit from both the reduced complexity of wideband LBT and the greater access granularity of subband LBT.

Additionally, it may be beneficial to ensure that all acquired LBT subbands form a contiguous BW. Therefore, rules may be required when acquiring the channel to ensure that the union of acquired LBT subbands form a contiguous set.

SUMMARY

Systems, methods, and devices for addressing wideband unlicensed channel access are disclosed herein. A device may be configured for different types of listen-before-talk (LBT) procedures, where the LBT type may refer to the frequency granularity of the LBT. There may be a hierarchical LBT procedure, where the LBT granularity changes at each point in the LBT procedure. There may be a selection of parameters for each LBT type. Some of the parameters may be shared over different points of the LBT procedure. There may be LBT subband sets for a subband set LBT type. There may be one or more indications of acquired LBT subbands on a condition of shared channel occupancy time. At one point in the LBT procedure, there may be a selection of a LBT subband or one or more subbands sets for transmission based on one or more criteria.

A wireless transmit/receive unit (WTRU) may be configured to perform the disclosed hierarchical LBT procedure. In the hierarchical LBT procedure, the WTRU may change the LBT type at different levels of the process. For example, the WTRU may first perform LBT to acquire available resources on an entire bandwidth part (BWP). If the BWP is not acquired, the WTRU may then perform LBT to acquire resources on one or more subband sets. If one or more subband sets are not acquired, the WTRU may then perform LBT to acquire available resources on one or more subbands. After every LBT attempt on a different LBT type, data may be transmitted if a sufficient number of resources have been acquired. Resources comprising one or more subband sets may be determined by at least one of previous LBT operation, network configuration, measurements, and transmission type. Performing LBT on one or more subband sets may include adjusting at least one LBT parameter, where the at least one LBT parameter may be a number of idle clear channel assessment (CCA) slots required. The hierarchical LBT procedure may further comprise monitoring multiple LBT subbands for a discovery reference signal (DRS) and transmitting a physical random access channel (PRACH) on an acquired LBT subband.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

Figure 1A:
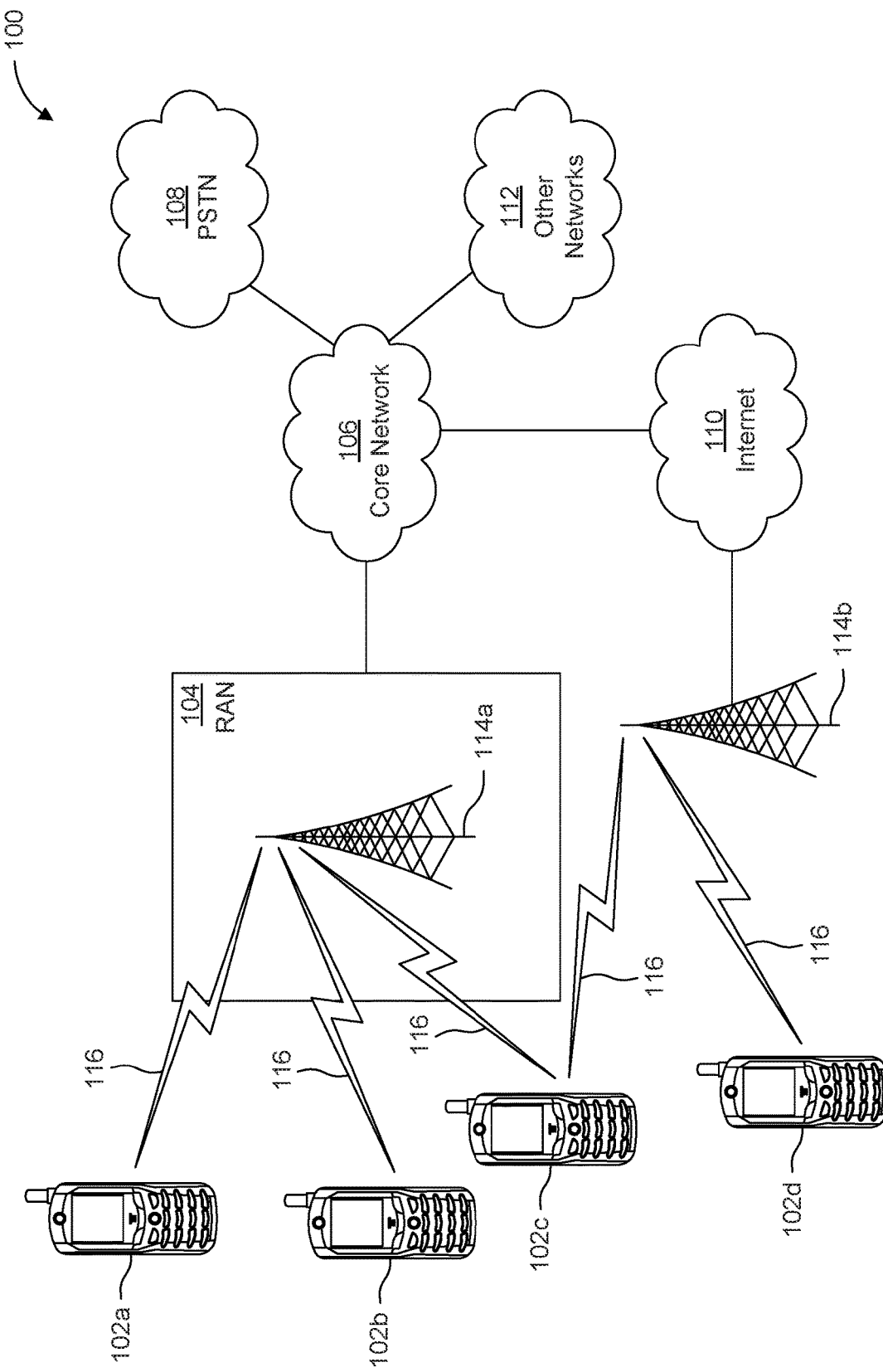
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations 114a, 114b may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using NR.

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
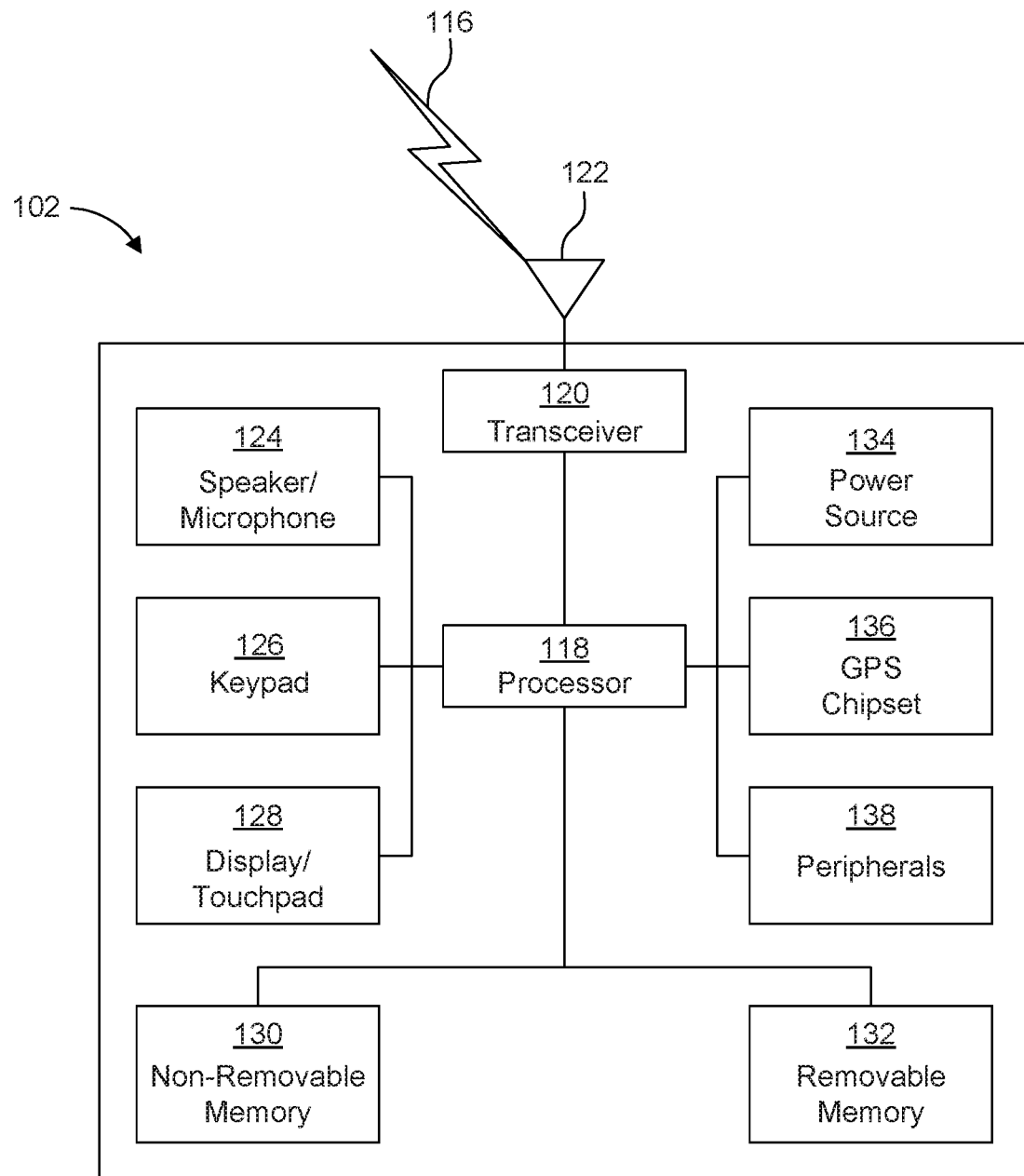
FIG. 1B is a system diagram illustrating an example wireless transmit/receive unit (WTRU) that may be used within the communications system illustrated in FIG. 1A according to an embodiment.
Figure 1C:
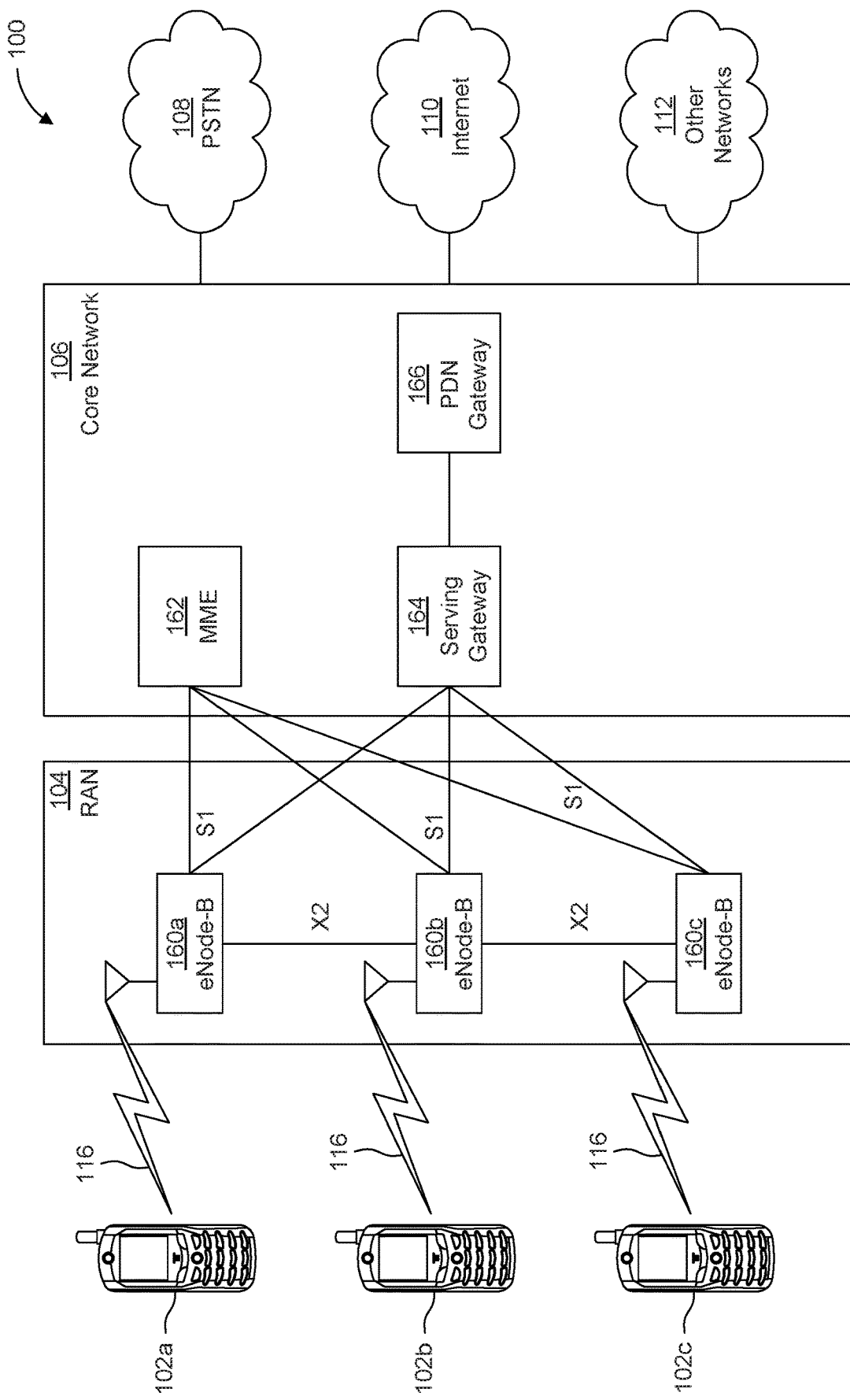
FIG. 1C is a system diagram illustrating an example radio access network (RAN) and an example core network (CN) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception)).

Figure 10:
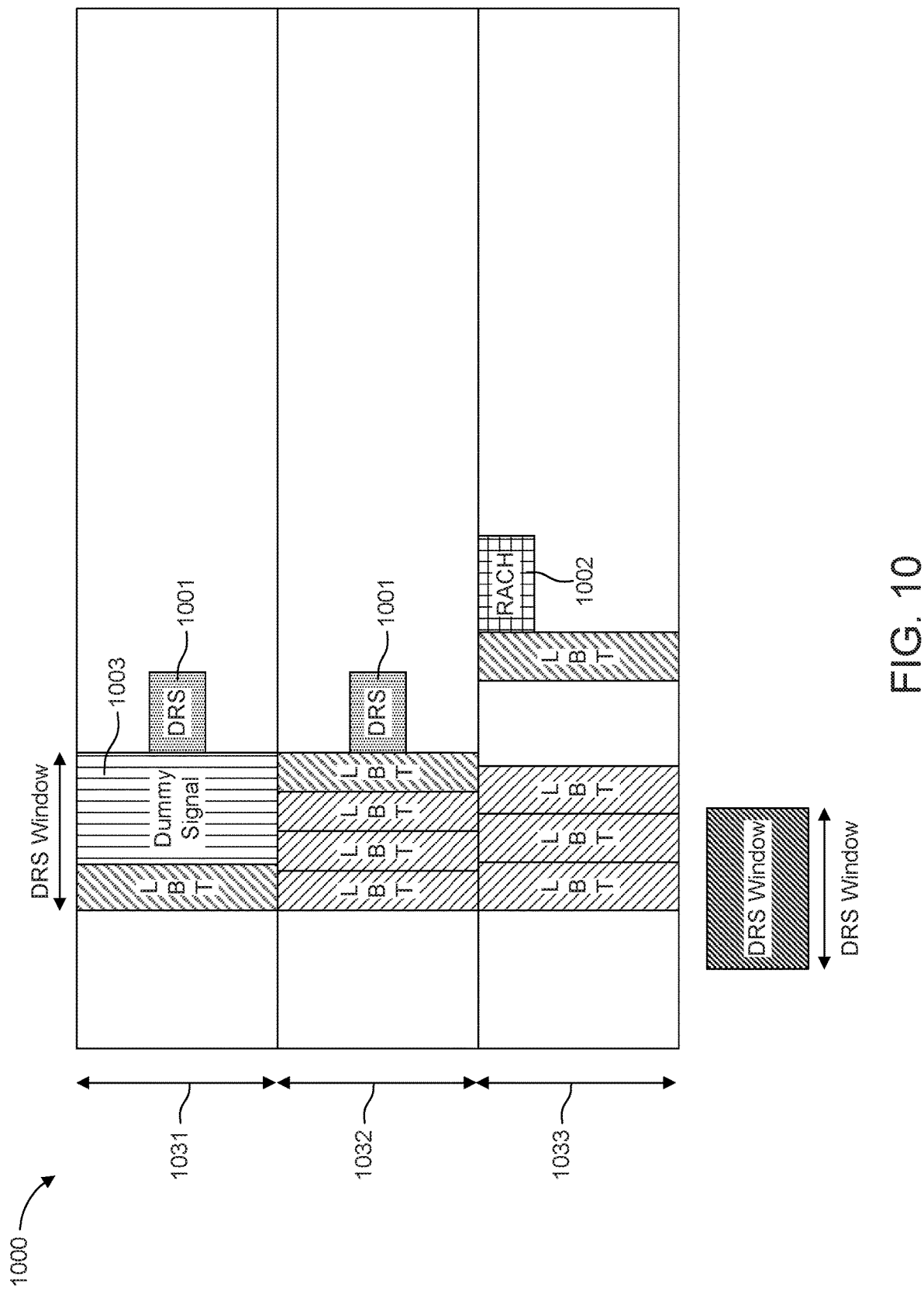
FIG. 10 is a diagram illustrating an example of joint DRS with PRACH on any subband.

FIG. 10 is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 10, the eNode-Bs 160a, 160b, 160c may communicate with one another over an X2 interface.

The CN 106 shown in FIG. 10 may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz, and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
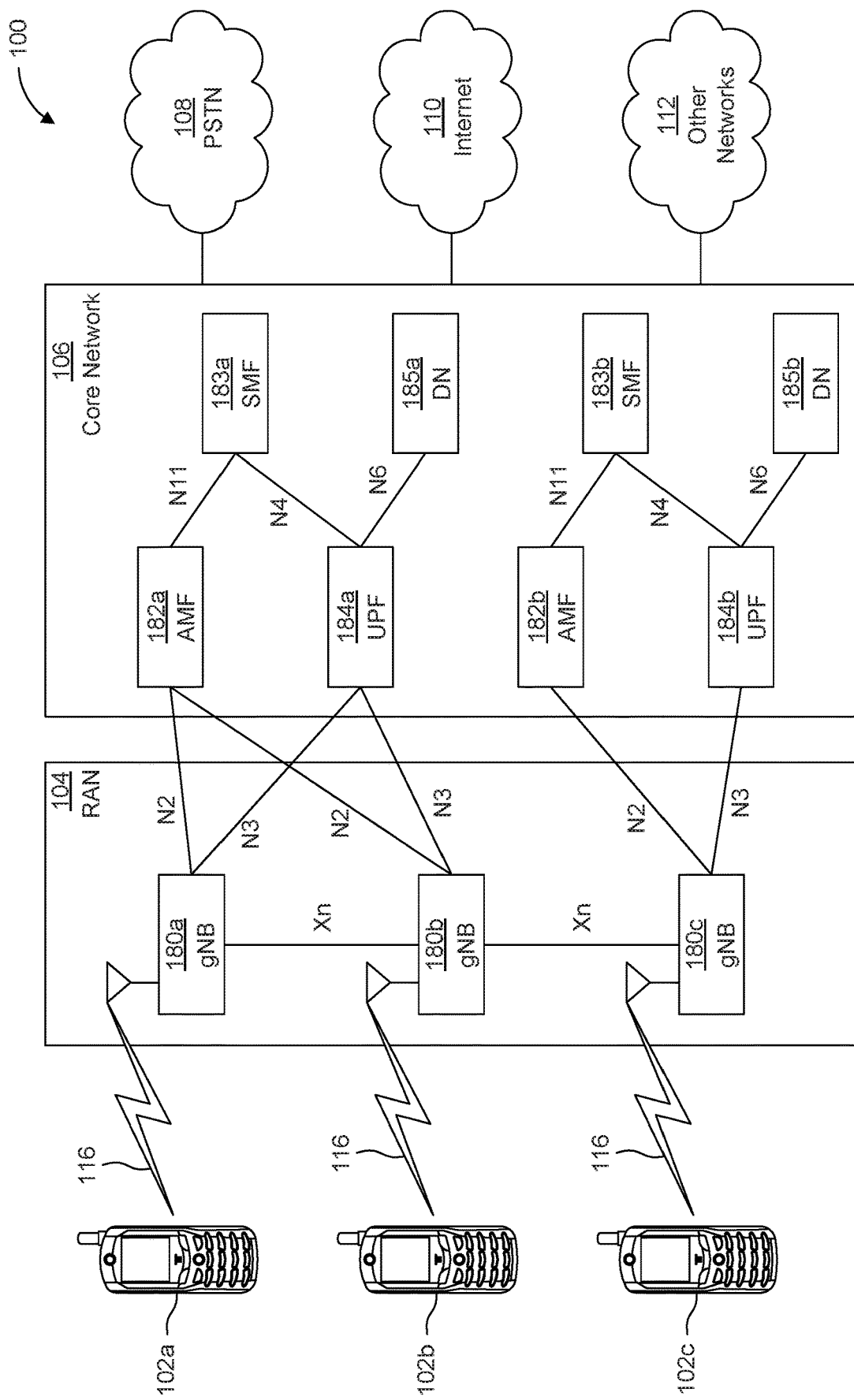
FIG. 1D is a system diagram illustrating a further example RAN and a further example CN that may be used within the communications system illustrated in FIG. 1A according to an embodiment.

FIG. 1D is a system diagram illustrating the RAN 104 and the CN 106 according to an embodiment. As noted above, the RAN 104 may employ an NR radio technology to communicate with the WTRUs 102*a*, 102*b*, 102*c* over the air interface 116. The RAN 104 may also be in communication with the CN 106.

The RAN 104 may include gNBs 180*a*, 180*b*, 180*c*, though it will be appreciated that the RAN 104 may include any number of gNBs while remaining consistent with an embodiment. The gNBs 180*a*, 180*b*, 180*c* may each include one or more transceivers for communicating with the WTRUs 102*a*, 102*b*, 102*c* over the air interface 116. In one embodiment, the gNBs 180*a*, 180*b*, 180*c* may implement MIMO technology. For example, gNBs 180*a*, 108*b* may utilize beamforming to transmit signals to and/or receive signals from the gNBs 180*a*, 180*b*, 180*c*. Thus, the gNB 180*a*, for example, may use multiple antennas to transmit wireless signals to, and/or receive wireless signals from, the WTRU 102*a*. In an embodiment, the gNBs 180*a*, 180*b*, 180*c* may implement carrier aggregation technology. For example, the gNB 180*a* may transmit multiple component carriers to the WTRU 102*a* (not shown). A subset of these component carriers may be on unlicensed spectrum while the remaining component carriers may be on licensed spectrum. In an embodiment, the gNBs 180*a*, 180*b*, 180*c* may implement Coordinated Multi-Point (CoMP) technology. For example, WTRU 102*a* may receive coordinated transmissions from gNB 180*a* and gNB 180*b* (and/or gNB 180*c*).

The WTRUs 102*a*, 102*b*, 102*c* may communicate with gNBs 180*a*, 180*b*, 180*c* using transmissions associated with a scalable numerology. For example, the OFDM symbol spacing and/or OFDM subcarrier spacing may vary for different transmissions, different cells, and/or different portions of the wireless transmission spectrum. The WTRUs 102*a*, 102*b*, 102*c* may communicate with gNBs 180*a*, 180*b*, 180*c* using subframe or transmission time intervals (TTIs) of various or scalable lengths (e.g., containing a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 106 shown in FIG. 1D may include at least one AMF 182a, 182b, at least one UPF 184a,184b, at least one Session Management Function (SMF) 183a, 183b, and possibly a Data Network (DN) 185a, 185b. While the foregoing elements are depicted as part of the CN 106, it will be appreciated that any of these elements may be owned and/or operated by an entity other than the CN operator.

The AMF 182a, 182b may be connected to one or more of the gNBs 180a, 180b, 180c in the RAN 104 via an N2 interface and may serve as a control node. For example, the AMF 182a, 182b may be responsible for authenticating users of the WTRUs 102a, 102b, 102c, support for network slicing (e.g., handling of different protocol data unit (PDU) sessions with different requirements), selecting a particular SMF 183a, 183b, management of the registration area, termination of non-access stratum (NAS) signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for MTC access, and the like. The AMF 182a, 182b may provide a control plane function for switching between the RAN 104 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 106 via an N11 interface. The SMF 183a, 183b may also be connected to a UPF 184a, 184b in the CN 106 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing DL data notifications, and the like. A PDU session type may be IP-based, non-IP based, Ethernet-based, and the like.

The UPF 184a, 184b may be connected to one or more of the gNBs 180a, 180b, 180c in the RAN 104 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local DN 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device (s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Operation in an unlicensed frequency band may be subject to some limits on the transmit power control (TPC), the radio frequency (RF) output power and power density given by the mean Equivalent Isotropically Radiated Power (EIRP) and the mean EIRP density at the highest power level. It may further be subject to requirements on the transmitter out of band emissions. Such requirements may be specific to bands and/or geographical locations.

Operation may be further subject to requirements on the Nominal Channel Bandwidth (NCB) and the Occupied Channel Bandwidth (OCB) as defined for unlicensed spectrum in the 5 GHz region. The NCB (i.e., the widest band of frequencies inclusive of guard bands assigned to a single channel) may be at least 5 MHz at all times. The OCB (i.e., the bandwidth containing 99% of the power of the signal) may be between 80% and 100% of the declared NCB. During an established communication, a device is allowed to operate temporarily in a mode where its OCB may be reduced to as low as 40% of its NCB with a minimum of 4 MHz.

Channel access in an unlicensed frequency band may use a Listen-Before-Talk (LBT) mechanism. LBT is typically mandated independently of whether the channel is occupied or not.

For frame-based systems, LBT may be characterized by a Clear Channel Assessment (CCA) time (e.g., ~20 μs), a Channel Occupancy time (e.g., minimum 1 ms, maximum 10 ms), an idle period (e.g., minimum 5% of channel occupancy time), a fixed frame period (e.g., equal to the channel occupancy time, plus the idle period), a short control signaling transmission time (e.g., maximum duty cycle of 5% within an observation period of 50 ms), and a CAA energy detection threshold.

For load-based systems (e.g., transmit/receive structure may not be fixed in time), LBT may be characterized by a number N corresponding to the number of clear idle slots in extended CCA instead of a fixed frame period. N may be selected randomly within a range.

Deployment for unlicensed operation scenarios may include different standalone NR-based operation, different variants of dual connectivity operation (e.g., E-UTRAN New Radio Dual Connectivity (EN-DC) with at least one carrier operating according to the LTE radio access technology (RAT) or NR DC with at least two set of one or more carriers operating according to the NR RAT), and/or different variants of carrier aggregation (CA) (e.g., possibly also including different combinations of zero or more carriers of each of LTE and NR RATs).

For example, for LTE, the following functionalities may be considered for a Licensed Assisted Access (LAA) system: LBT (i.e., clear channel assessment); discontinuous transmission on a carrier with limited maximum transmission duration; carrier selection; transmit power control; radio resource management (RRM) measurements including cell identification; and/or channel-state information (CSI) measurement, including channel and interference.

A LBT procedure may be defined as a mechanism by which equipment applies a CCA check before using the channel. The CCA may utilize at least energy detection to determine the presence or absence of other signals on a channel in order to determine if a channel is occupied or clear, respectively. European and Japanese regulations mandate the usage of LBT in the unlicensed bands. Apart from regulatory requirements, carrier sensing via LBT is one method for ensuring fair sharing of the unlicensed spectrum and is therefore considered to be a vital feature for fair and friendly operation in the unlicensed spectrum in a single global solution framework.

Discontinuous transmission on a carrier with limited maximum transmission duration may be a required functionality for LAA because in unlicensed spectrum, channel availability cannot always be guaranteed. Further, certain regions such as Europe and Japan may prohibit continuous transmission and impose limits on the maximum duration of a transmission burst in the unlicensed spectrum.

Carrier selection, since there is a large available bandwidth of unlicensed spectrum, may be required for LAA nodes to select the carriers with low interference and with that achieve good co-existence with other unlicensed spectrum deployments.

Transmit Power Control (TPC) is a regulatory requirement in some regions by which the transmitting device should be able to reduce the transmit power in a proportion of 3 dB or 6 dB compared to the maximum nominal transmit power.

Radio resource management (RRM) measurements such as cell identification may enable mobility between SCells and robust operation in the unlicensed band.

For Channel-State Information (CSI) measurement, including channel and interference, a WTRU operating in an unlicensed carrier may also support the necessary frequency/time estimation and synchronization to enable RRM measurements and for successful reception of information on the unlicensed band.

In NR, a WTRU may operate using bandwidth parts (BWPs) in a carrier. First, a WTRU may access the cell using an initial BWP. It may then be configured with a set of BWPs to continue operation. At any given moment, a WTRU may have 1 active BWP. Each BWP may be configured with a set of control resource sets (CORESETs) within which a WTRU may blind decode candidates for scheduling, among other things.

Furthermore, NR may support variable transmission duration and feedback timing. With variable transmission duration, a PDSCH or PUSCH transmission may occupy a contiguous subset of symbols of a slot. With variable feedback timing, the DCI for a DL assignment may include an indication for the timing of the feedback for the WTRU (e.g., by pointing to a specific PUCCH resource).

NR in unlicensed bands (NR-U) may need to consider initial access, Scheduling/HARQ, and mobility, along with coexistence methods with LTE-LAA and other incumbent RATs. Deployment scenarios may include different standalone NR-based operation, different variants of dual connectivity operation (e.g., EN-DC with at least one carrier operating according to the LTE RAT or NR DC with at least two set of one or more carriers operating according to the NR RAT), and/or different variants of CA (e.g., possibly also including different combinations of zero or more carriers of each of LTE and NR RATs).

NR-U may support four categories of channel access schemes for NR-U operations. Channel access categories may include immediate transmission after a short switching gap (i.e., category 1 LBT), LBT without random back-off (i.e., category 2 LBT) and LBT with random back-off with fixed and variable contention window size (i.e., category 3 and 4 LBT, respectively).

NR-U may also perform Listen-Before-Talk (LBT) using CCAs on LBT subbands of 20 MHz. A BWP may be a single LBT subband or may be composed of multiple LBT subbands.

The time for which a channel has been acquired for transmission may be deemed a channel occupancy time (COT). The COT may be acquired by a WTRU or by a gNB and may be subsequently shared with the other node. The total COT duration—including any sharing—cannot exceed maximum COT.

Figure 2:
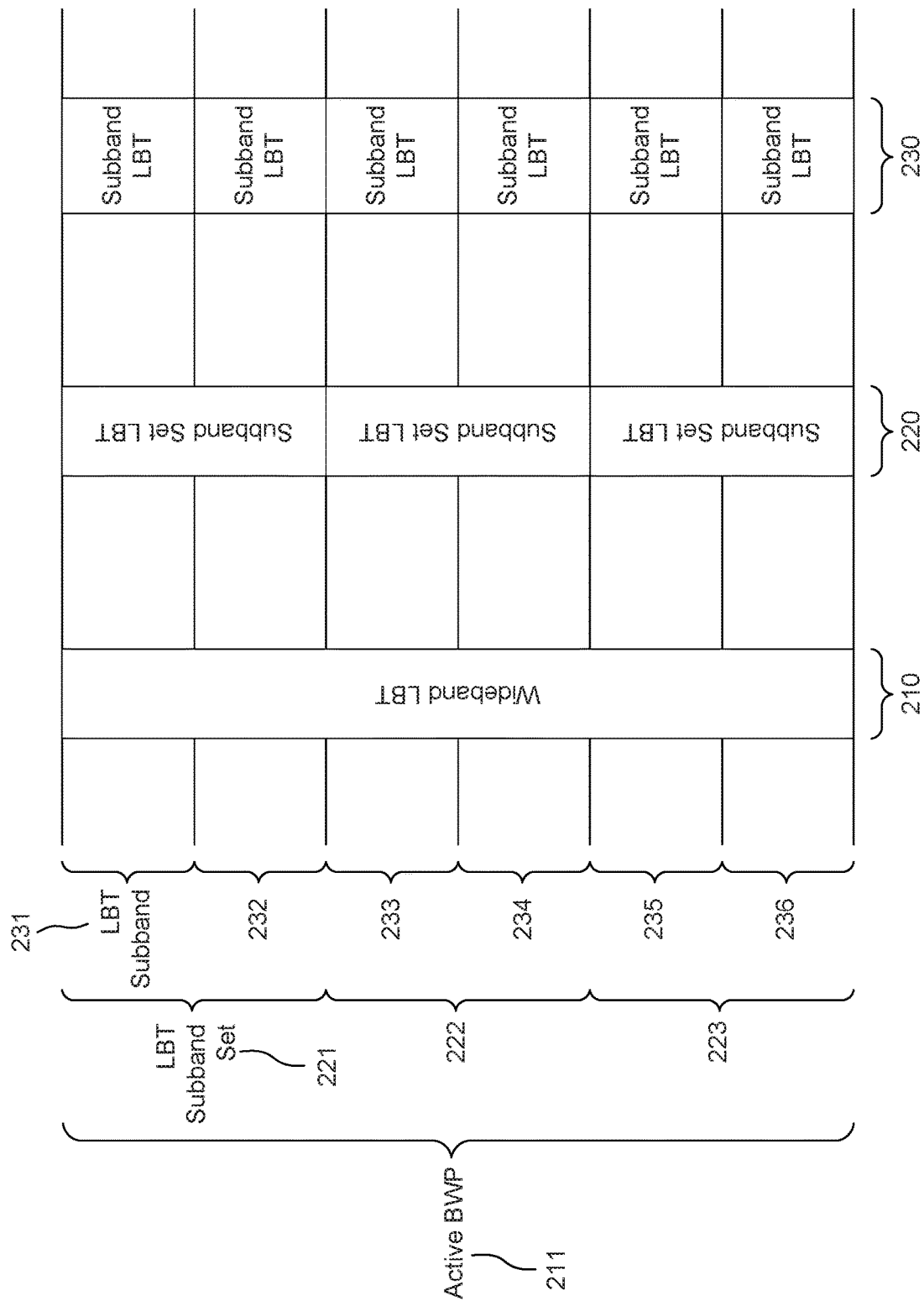
FIG. 2 is a diagram illustrating examples of different LBT types covering a whole bandwidth part (BWP)

FIG. 2 is a diagram 200 illustrating examples of different LBT types covering a whole BWP 211. A WTRU may perform LBT for channel access with different bandwidth granularity. A WTRU may be configured with a BWP 211 that encompasses multiple LBT subbands 231-236. In some embodiments, an LBT subband may be the smallest BW on which a WTRU may perform an LBT procedure (e.g. 20 MHz). In other embodiments, the size of an LBT subband may be configurable.

To access the BWP 211, or a portion thereof, the WTRU may perform an LBT procedure on one or more LBT subbands 231-236 (i.e., subband LBT 230), or a LBT procedure on one or more sets of contiguous LBT subbands forming a subband set 221-223 (i.e., subband set LBT 220), or an LBT procedure on the totality of the BWP 211 (i.e. wideband LBT 210). As discussed herein, subband LBT 230, subband set LBT 220 or wideband LBT 210 may be referred to as types of LBT. Also, as discussed herein, the WTRU may be assumed to be performing the LBT procedure; however, any method discussed may also be applicable to another node (e.g., where the base station may perform the LBT).

The LBT type to be used for a transmission may depend on one or more factors.

One such factor may be the required bandwidth to be acquired. For example, depending on the size of the BW to be acquired for a transmission, the WTRU may use a different LBT type. The WTRU may use the LBT type that best matches the BW to be acquired. For example, if a WTRU must acquire x LBT subbands, the WTRU may use a subband set LBT that covers at least x LBT subbands. In another example, if the WTRU must acquire x LBT subbands, the WTRU may use the wideband LBT type if x LBT subbands is greater than a configurable threshold.

Another factor may be the required BW indicated by the network.

Another factor may be the required BW of an ongoing COT.

Another factor may be the required BW required for an upcoming transmission. For example, it may be the set of frequency resources granted for an UL transmission.

Another factor may be the previous LBT type used. The WTRU acquiring an unlicensed channel may reuse the same LBT type for a same acquisition BW. There may be a validity timer upon whose expiration the LBT type may be reset. For example, if the timer expires, the WTRU may fall back to wideband LBT, subband set LBT or subband LBT.

Another factor may be the previous LBT used by another node. For example, in a gNB initiated shared COT, the WTRU may reuse the same LBT type as that previously used by the gNB.

Another factor may be the indication by the network. The WTRU may be indicated dynamically, semi-statically or statically the LBT type to use for a channel acquisition.

Another factor may be the transmission type. Depending on priority of the transmission or the physical channel to be transmitted, the WTRU may select a specific LBT type for channel acquisition.

Another factor may be the parameters of the LBT procedure. For example, in embodiments, the WTRU may select an LBT type based on the contention window size (CWS) of each LBT type.

A WTRU may determine the set of LBT subbands to perform LBT prior to transmission based on an indication received prior to LBT.

In embodiments, the indication may relate to a function tied to the set of LBT subbands previously acquired by the gNB. For example, in a gNB acquired COT, the WTRU may be indicated the set of LBT subbands acquired by the gNB. The WTRU may then perform LBT on the same set of LBT subbands. In another method, the WTRU may determine a subset of LBT subbands (i.e., subset of that acquired by the gNB) on which to perform LBT.

In embodiments, the indication may relate to resources required for transmission. For example, the WTRU may have a set of resources for a transmission, and the WTRU may perform LBT on at least the set of LBT subbands that cover the resources to be used for the transmission. The resources for a transmission may be indicated to the WTRU dynamically (e.g., grant based scheduling), semi-statically (e.g., grant free scheduling or PUCCH transmission) or statically.

The indication to the WTRU may be an explicit indication. A WTRU may receive an indication from the gNB providing the set of LBT subbands on which it may perform LBT.

The indication received by the WTRU may relate to a type of transmission. For example, for a PUSCH retransmission, the WTRU may be required to acquire a specific subset of LBT subbands (e.g., to match that used for a previous transmission).

The indication may relate to a the use of Code Block Group (CBG) transmissions or retransmissions. For example, if a WTRU is configured to use CBG transmissions or retransmissions, it may be possible to acquire a set of LBT subbands that do not wholly cover the resource allocation of the total transport block.

Figure 3:
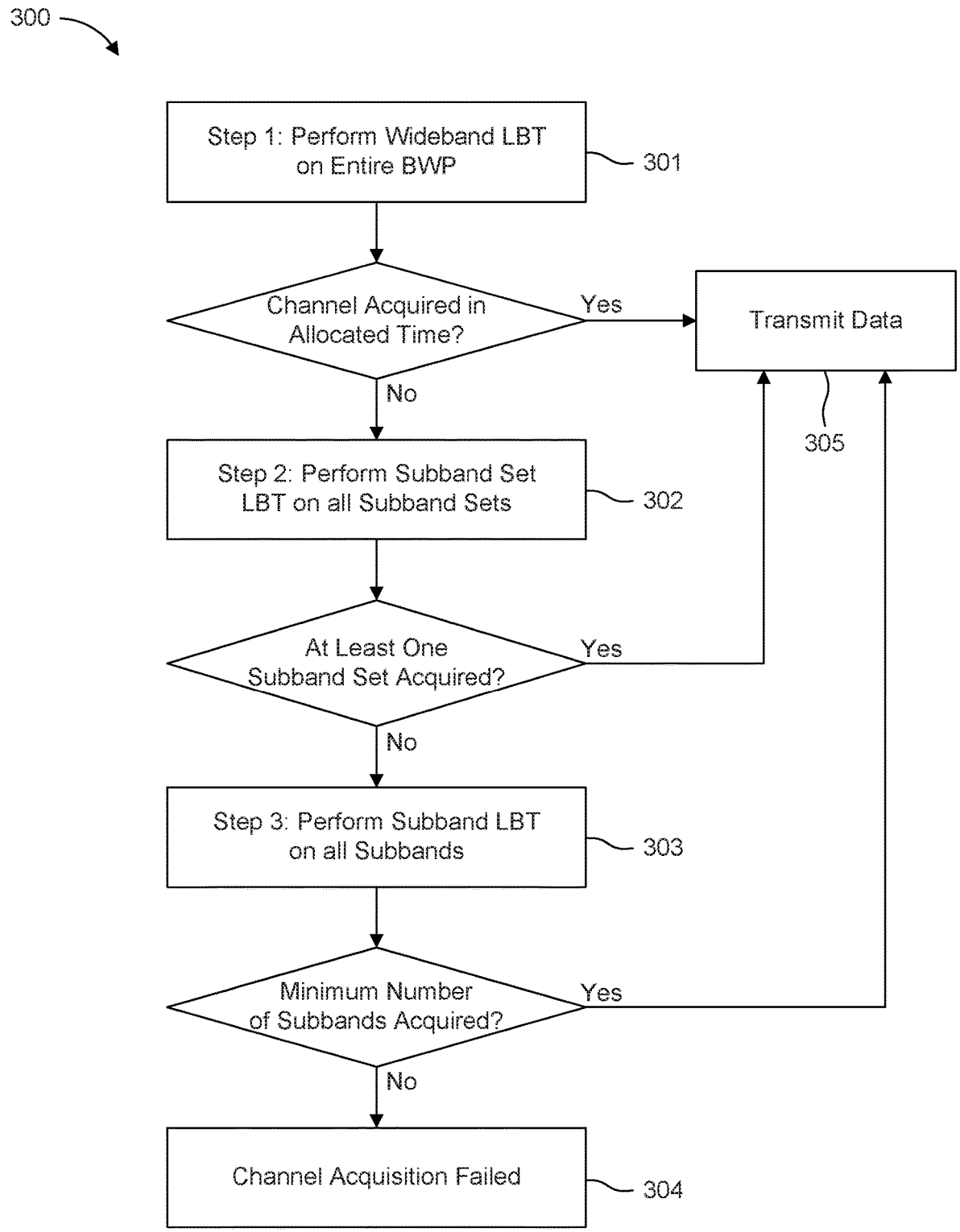
FIG. 3 is a flow chart illustrating an example of hierarchical LBT with a transmission possibility after every LBT performed.

FIG. 3 is a flowchart 300 illustrating an example of hierarchical LBT with a transmission possibility after every LBT performed. A WTRU may be configured to perform hierarchical LBT. Hierarchical LBT may be defined as a process where the WTRU changes the LBT type at different levels of the process. At 301, the WTRU may perform wideband LBT. If the wideband LBT is successful (i.e., the channel is acquired in the allocated time), the WTRU may assume the whole BWP has been acquired for transmission and may proceed to 305 and data may be transmitted on all subbands. If the wideband LBT is not successful (i.e., the channel is not acquired in the allocated time), the WTRU may proceed to 302, where the WTRU may perform one or more subband set LBTs. If one or more of the subband set LBTs is successful, the WTRU may assume that it has acquired the union of all LBT subband sets where subband set LBT was successful and may proceed to 305, where data is transmitted on subbands in the acquired subband sets. If all the subband set LBTs fail, the WTRU may proceed to 303, where the WTRU may perform one or more subband LBTs 230 by cycling through all configured subbands of a BWP or simultaneously on multiple subbands at one time. If a minimum number of subband LBTs are successful, the WTRU may assume that it has acquired the LBT subbands where subband LBT was successful and may proceed to 305, where data is transmitted on acquired subbands. If the minimum number of subbands are not acquired, channel acquisition has failed 304. The minimum number of subbands required may be a configured value or may be determined from a parameter of an associated transmission or a parameter obtained from a grant for a transmission.

Thus, in the embodiment illustrated in FIG. 3, after every LBT attempt on a different LBT type, the WTRU may transmit if it has acquired sufficient resources. Note that it is possible that the LBT subband sets in 302 are composed of single LBT subbands, in which case 303 may not be required for the process. Note also that more LBTs may be performed. For example, there may be multiple subband set LBTs where for each subsequent group of subband set LBTs performed, the subband set size may vary (e.g. decrease). For example, there may be multiple points within the hierarchical LBT procedure where the WTRU may perform subband set LBT and the WTRU may vary the subband set size at each subband set LBT.

Figure 4:
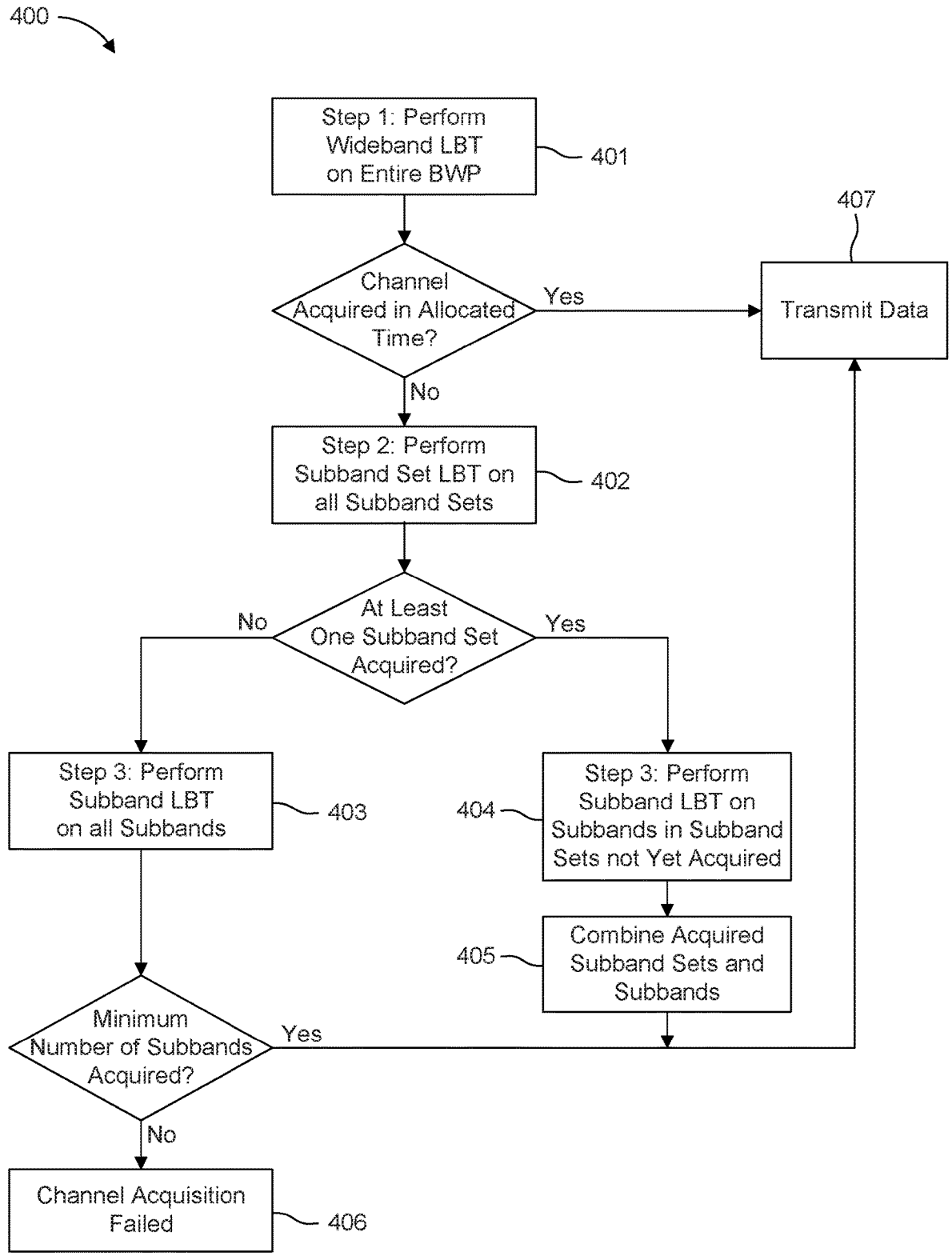
FIG. 4 is a flow chart illustrating an example of hierarchical LBT with a combined subband set and an individual subband channel acquisition.

FIG. 4 is a flowchart 400 illustrating an example of hierarchical LBT with a combined subband set and an individual subband channel acquisition. At 401, the WTRU may perform wideband LBT. If the wideband LBT is successful, the process may proceed to 407 and data may be transmitted by the WTRU on all subbands. Upon determination that wideband LBT is in not successful, (i.e., the channel is not acquired in the allocated time), the process may proceed to 402 where the WTRU may perform one or more subband set LBTs. If all of the subband set LBTs fail, the process may proceed to 403, where the WTRU may perform one or more subband LBTs. If at least one of the subband set LBTs is successful, the WTRU may assume that it has acquired the union of all LBT subband sets where subband set LBT was successful and may proceed to 404. At 404, for the group of LBT subband sets where the channel is not successfully acquired, the WTRU may attempt to acquire individual LBT subbands from the remaining LBT subband sets. In such a case, at 405, all acquired subband sets (from 402) along with all acquired individual LBT subbands (from 404) may be combined to form an over-all acquired channel. If the minimum number of LBT subbands are required, the WTRU may proceed to 407 and data may be transmitted over the acquired LBT subbands. If the minimum number of LBT subbands are not acquired, channel acquisition has failed 406.

In embodiments, the hierarchical LBT procedure may occur over multiple attempts. For example, in a first channel access attempt, the WTRU may use a wideband LBT. Upon failure to acquire the channel, the WTRU may use a subband set LBT for a future channel acquisition attempt. Upon failure to acquire the channel using subband set LBT, the WTRU may use subband LBT for a future channel acquisition attempt. The WTRU may also adapt the BW of the LBT in the opposite direction. For example, upon successfully acquiring multiple LBT subbands in a channel acquisition attempt, the WTRU may proceed to subband set LBT for a future channel acquisition attempt. Similarly, upon successfully acquiring multiple subband sets, the WTRU may proceed with wideband LBT for a future channel acquisition attempt.

The WTRU may be configured with a stopping criterion to determine when to stop the hierarchical LBT process. The stopping criterion for wideband LBT may be acquisition of the wideband channel. The stopping criterion for subband set LBT and subband LBT may be more complicated. In embodiments, the WTRU may stop the procedure at subband set LBT upon acquisition of a sufficient number of subband sets. In other embodiments, the WTRU may stop the procedure at subband set LBT upon acquisition of the largest possible contiguous group of subband sets.

Figure 5:
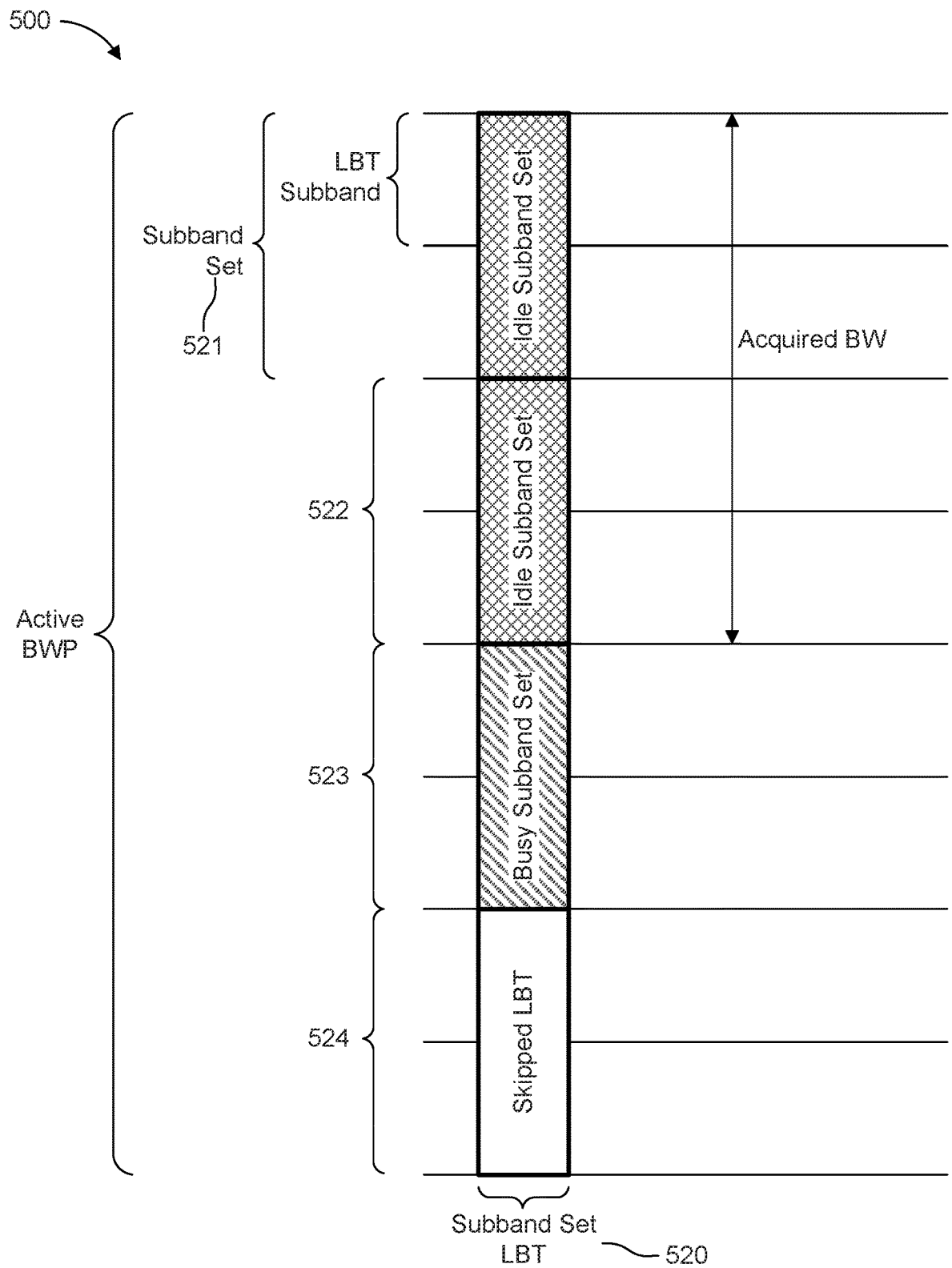
FIG. 5 is a diagram illustrating an example of a stopping criterion being achieved when the largest group of contiguous subband sets is acquired.

FIG. 5 is a diagram 500 illustrating an embodiment where the stopping criterion for the subband set LBT 520 occurs when the largest group of contiguous subband sets is acquired. As shown in FIG. 5, the WTRU has acquired the first two subband sets 521, 522 and then fails to acquire the third 523. Given that there is just a last subband set to acquire 524, it may be impossible to acquire a larger contiguous group of subband sets than that which has already been acquired. Therefore, the WTRU may proceed to add additional contiguous subbands or stop the procedure altogether.

In other embodiments, the WTRU may stop the procedure after subband LBT upon acquisition of a sufficient number of LBT subbands. The sufficient number of LBT subbands may be determined as a function of the maximum and/or minimum required number of resources for the associated transmission. In another example, the WTRU may stop the procedure after subband LBT upon determination that union of the LBT subband sets acquired during the subband set LBT and LBT subbands acquired during the subband LBT is sufficient. In other embodiments, the WTRU may only consider LBT subbands during the subband LBT that are contiguous (e.g., contiguous with other subbands acquired during the subband LBT or with subband sets acquired during subband set LBT). Upon a determination that there are no more contiguous LBT subbands, the WTRU may stop the subband LBT.

Depending on the physical channel to transmit or whether the unlicensed channel is to be acquired by the WTRU in a gNB shared COT or WTRU initiated COT, the WTRU may use different LBT categories (e.g., categories 1-4). Each LBT category may define a specific LBT procedure to be done to acquire the channel. For example, the LBT category may mean that the WTRU may acquire the channel upon a one-shot CCA deeming the channel idle. Category 4 LBT requires the use of full LBT, wherein the WTRU must first determine N CCAs indicate the channel is idle prior to accessing the channel. The value N may be determined as a random number selected from 1 to CWS, where the CWS may be adapted (e.g., based on previous transmission performance).

In the hierarchical LBT procedure described herein, the LBT category may change depending on the type of LBT being performed. For example, for a WTRU acquired COT, category 4 LBT may be required. As such, in embodiments, the WTRU may perform category 4 LBT for wideband LBT. If the channel is deemed busy, the WTRU may perform LBT on each of the subband sets. For the subband set LBT and the subband LBT the WTRU may adapt the LBT category, or parameters thereof. For example, the LBT category for subband set LBT and/or the subband LBT may change to category 2 LBT. In other embodiments, for the subband set LBT and/or the subband LBT, the LBT category may remain category 4 LBT, however the CWS value may be reduced. In embodiments, the CWS value may be reduced to the number of CCAs required.

In other embodiments, if at least one LBT subband set has been successfully acquired in subband set LBT using category 4 LBT, then the remaining LBT subband sets in subband set LBT or any future LBT subband in subband LBT may use a different category (e.g., category 2 LBT). Similarly, if at least one LBT subband in subband LBT has been acquired using category 4 LBT, then the remaining LBT subbands in subband LBT may use a different LBT category (e.g., category 2 LBT).

In other embodiments, the WTRU may be configured with anchor subband sets and/or LBT subbands. On such anchors, the WTRU may use category 4 LBT. Further, upon successful acquisition of such an anchor subband set or subband, the WTRU may perform LBT on other subband sets or subbands, using a different LBT category (e.g., category 2 LBT).

In other embodiments, the LBT performed on the entire BWP is a category 4 LBT. The WTRU may need to determine N idle CCA slots. Assuming the WTRU determines M idle CCA slots in the allowed time (where M<N), the WTRU may perform LBT on subband sets where the WTRU may then perform category 4 LBT on each subband set requiring the determination of N-M clear CCA slots in a subband set. For a subband set where the WTRU only determines P clear CCA slots by the end of subband set LBT (where P<N-M), the WTRU may perform subband LBT where, for the subbands in the subband set where P clear CCA slots were determined, the WTRU may perform category 4 LBT such that it needs to determine N-M-P clear CCA slots.

Figure 6:
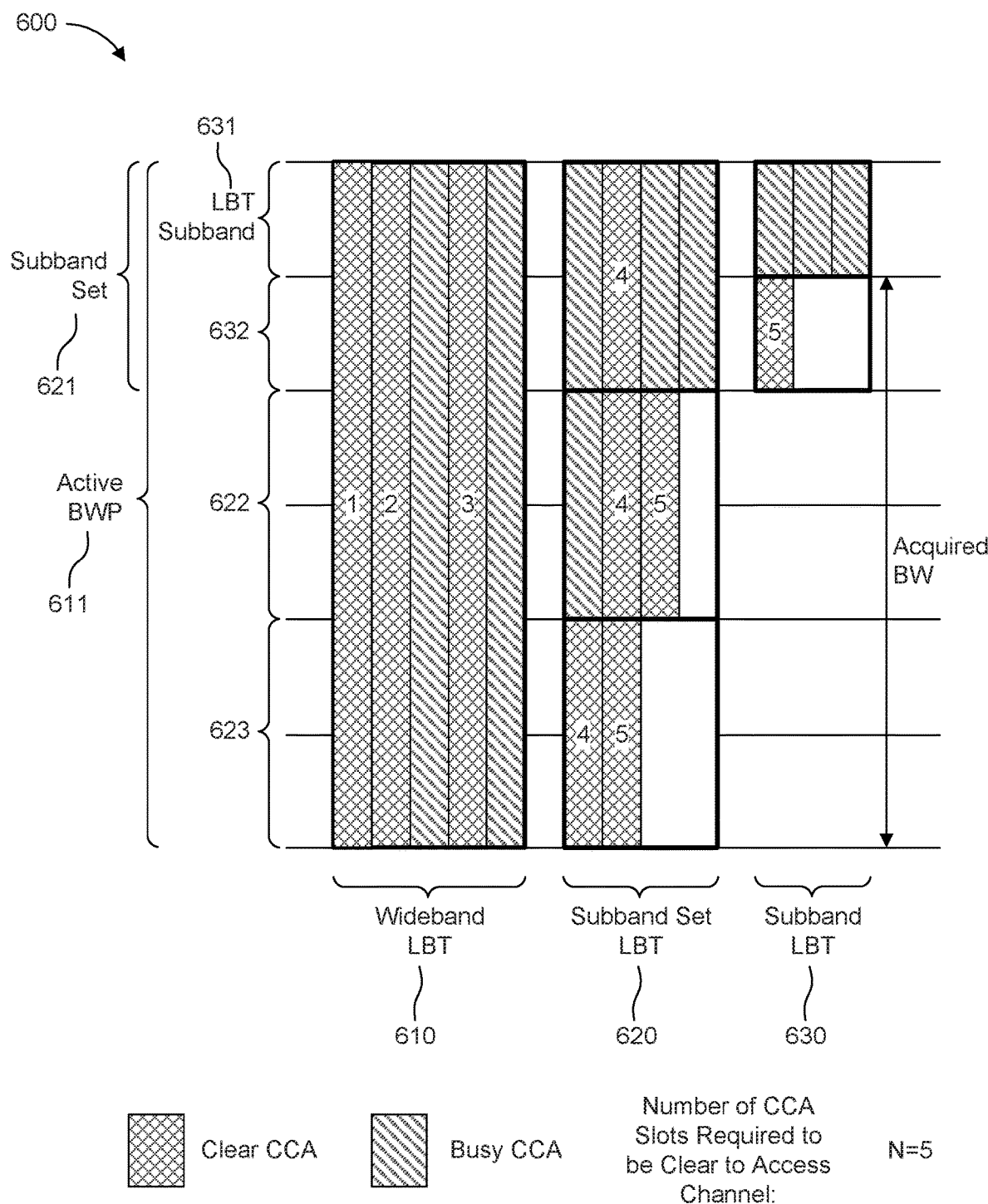
FIG. 6 is a diagram illustrating an example of hierarchical category 4 LBT.

FIG. 6 is a diagram 600 illustrating an example hierarchical LBT 600 where category 4 LBT is used for every LBT type. In this example, the number of required clear CCA slots is N=5. However, this value may be selected at random from a range determined by the a CWS value. During the time allotted to wideband LBT 610, the WTRU may determine M=3 clear CCA slots in the BWP 611. Therefore, for the subband set LBT 620, the WTRU may now need to find an additional N-M=2 clear CCAs in each subband set. This may be achieved in two of the subband sets 622, 623 in the time allotted for subband set LBT 620. One of the subband sets 621 may fail. Therefore, subband sets 622, 623 may be deemed acquired for transmission. The WTRU may then proceed to subband LBT 630 for the remaining subbands 631 and 632, where it must find N-M-P=1 clear CCA. In this example, a single LBT subband 632 may be deemed acquired at the end of the subband LBT 630. The over-all acquired BW is thus all subbands except for the first LBT subband 631.

In embodiments, a WTRU may maintain CWS values for the whole wideband, and/or per subband set and/or per individual LBT subband. In other embodiments, the WTRU may maintain CWS values per priority of the intended transmission. When performing hierarchical LBT, the WTRU may determine the CWS value for the wideband LBT based on at least one the following: a value maintained and used for wideband LBT, where this value may be determined as a function of a previously used CWS for wideband LBT (e.g., an increment greater or lesser than a previously used CWS value); a function using as input the multiple CWS values of the subband sets that together combine to form the wideband (e.g., one per subband set), where such a function may be an average CWS, a maximum CWS or a minimum CWS; and/or a function using as input the multiple CWS values of the LBT subbands that together combine to form the wideband (e.g., one per LBT subband), where such a function may be an average CWS, a maximum CWS or a minimum CWS.

The WTRU may determine the CWS values for the subband sets (e.g. one per subband set), based on at least one of: a value maintained per subband set, where the WTRU may maintain CWS values per subband set, and the values may be determined as a function of a previously used CWS for the subband set (e.g., an increment greater or lesser than a previously used CWS value); a function using as input the multiple CWS values of the LBT subbands that together combine to form a subband set (e.g., one per LBT subband), where such a function may be an average CWS, maximum CWS or minimum CWS; a function using as input the CWS value used for the wideband LBT performed in a previous LBT; and/or a function using as input the CWS of other subband sets, where, for example, if the WTRU is required to acquire a minimum number of LBT subbands and/or subband sets for a transmission, the WTRU may use as input the CWS values of any possible combination of subband sets achieving the minimum value.

The WTRU may determine the CWS values for the LBT subbands (e.g., one per LBT subband), based on at least one of: a value maintained per LBT subband, where the WTRU may maintain CWS values per LBT subband, and the values may be determined as a function of a previously used CWS for the LBT subband (e.g., an increment greater or lesser than a previously used CWS value); a function using as input the CWS value used for the subband set LBT, of which an LBT subband is a member, performed in a previous LBT; a function using as input the CWS value used for the wideband LBT performed in a previous LBT; a function using as input the CWS of other LBT subbands and/or subband sets, where, for example, if the WTRU is required to acquire a minimum number of LBT subbands for a transmission, the WTRU may use as input the CWS values of any possible combination of LBT subbands and/or subband sets achieving the minimum value; and/or a function using as input the CWS of subband sets acquired in a previous LBT.

In considering the construction of LBT subband sets, for the subband set LBT type, the WTRU may perform a single LBT procedure on a set of LBT subbands. The subband sets may be configurable. Such configuration may be received by the WTRU in a dynamic, semi-static, or static manner. The LBT subbands in a subband set may be contiguous. In another method, any LBT subband may be configured into a subband set, including LBT subbands that do not form a contiguous set.

The contents of a LBT subband set may be determined by at least one of several factors.

One such factor for determining a subband set may be semi-static configuration. For example, the WTRU may be indicated the number of LBT subbands to be included in each subband set and using LBT subband index, the WTRU may determine the LBT subbands to be included in each subband set.

One such factor for determining a subband set may be based on prior use. For example, in a shared COT, if the gNB used a subband set configuration for a previous channel acquisition in the same COT, the WTRU may use the same subband set configuration. In another example, the WTRU may reuse a subband set configuration that it used in a previous channel acquisition.

Another factor for determining a subband set may be measurements. The WTRU may perform measurements on LBT subbands (e.g., channel occupancy measurements). Based on these measurements, the WTRU may determine subband sets (e.g., such that similar channel load is expected for all LBT subbands of a subband set). In another example, the WTRU may perform measurements to determine subband set configuration and may report a preferred configuration to the gNB (e.g., the WTRU may feedback a desired number of LBT subbands per subband set).

Another factor for determining a subband set may be previous LBT performance. For example, the WTRU may determine a subband set based on combining LBT subbands that have similar historical LBT performance. There may be a validity timer, upon whose expiration the WTRU may assume that any historical knowledge is no longer applicable.

Another factor for determining a subband set may be LBT parameters of LBT subbands. For example, the WTRU may combine LBT subbands to form subband sets if the LBT parameters (e.g., CWS) of all the LBT subbands are the same.

Another factor for determining a subband set may be persistent or periodic CCA. For example, in embodiments, the WTRU may be configured to perform periodic CCA on LBT subbands, regardless of whether it has data to transmit. The WTRU may combine LBT subbands to form subband sets depending on the current number of CCAs observed in recent periodic CCA occasions. For example, in embodiments, the WTRU may combine LBT subbands that have a similar number of recent idle CCA slots in order to increase the probability of acquiring the overall subband set. The composition of recent CCA occasions may use a sliding window in order to remove the effect of old CCA measurements.

Another factor for determining a subband set may be the level of a hierarchical LBT procedure. In some hierarchical LBT procedures, there may be multiple levels with varying sizes of subband sets. For example, the size of the subband sets may decrease for each subsequent level.

In some cases there may be an indication of the acquired set of LBT subbands. In a shared COT, the WTRU may acquire a set of LBT subbands that is different than those previously acquired by the gNB. For example, the WTRU may only perform LBT on the set of LBT subbands previously acquired by the gNB and may acquire a subset of the subbands. In another example, the WTRU may perform LBT on a set greater than those acquired by the gNB and may acquire a greater subset of LBT subbands than the gNB. The WTRU may indicate to the gNB the subset that is successfully acquired. This may be especially beneficial in cases where the WTRU acquires a greater subset of LBT subbands compared to that previously acquired by the gNB. It may enable the gNB to perform actions to reserve the unused LBT subbands. The WTRU may also not expect a future switch to the gNB to include any subbands that were not acquired by the WTRU. In other embodiments, the WTRU may expect all gNB transmissions during the COT to use the same BW acquired by the gNB, regardless of the BW acquired by the WTRU.

In embodiments, the WTRU may acquire more than one LBT subband in the UL transmission. In such embodiments, the WTRU may transmit on all acquired subbands. The WTRU may rate match its transmission to fit the resources acquired. The WTRU may define a minimum reliability metric (e.g., MCS, or coding rate, that it may transmit at and transmit enough data to match the minimum reliability metric).

In embodiments where the WTRU acquires more than one LBT band in the UL transmission, the WTRU may transmit on a subset (i.e., one or more) of the acquired subbands. The WTRU may select the one or more subbands based on a priority measure or parameter. In one embodiment, the WTRU may be configured with a priority value for each subband and transmit on that subband only if a randomly drawn number is greater than, or less than, that priority number. In one embodiment, the CAT×LBT deferment duration may implicitly signal the priority by having different CWS or different LBT measurement durations. A WTRU that has larger CWS parameters for a band will have a lower probability of acquiring the channel before it is busy.

In embodiments where a gNB may assign a WTRU multiple resources/subbands, the gNB and WTRU behavior may be modified to increase the transmission efficiency. The gNB may assign each individual WTRU to more than one exclusive resource. This may occur in embodiments where ultra-reliable and/or low latency transmission by the WTRU may be needed and as such, the WTRU may need to have multiple opportunities (i.e., subbands) to transmit. The gNB may allow overlap of resources assigned to WTRUs, where one or more of the following may apply: a WTRU may be granted a resource with some level of priority to increase the chance of transmitting if its primary resource may be busy but not be exclusively assigned to the secondary resource; the WTRU may be assigned to a grant-free/configured grant resource; and the WTRU may be assigned to a non-orthogonal multiple access resource.

In NR-U, a Discovery reference signal is used for initial access, to enable WTRUs to synchronize to the gNB and to acquire broadcast channel information and establish a connection using random access.

In an active COT that is acquired and controlled by the gNB, the discovery reference signal (DRS) may be transmitted at periodic intervals. However, in the case that the transmission of a DRS is scheduled to occur outside an active COT, the DRS may be transmitted at any time within a periodic DRS window. This requires that the gNB perform a wideband LBT before transmission. The WTRU may also need to perform a wideband LBT before transmitting the random access channel (RACH) signals.

Initial access in wideband channels outside the COT may be one of the following: DRS window on primary or anchor band only; independent DRS windows per band; and/or jointly transmitted DRS on all bands.

Figure 7:
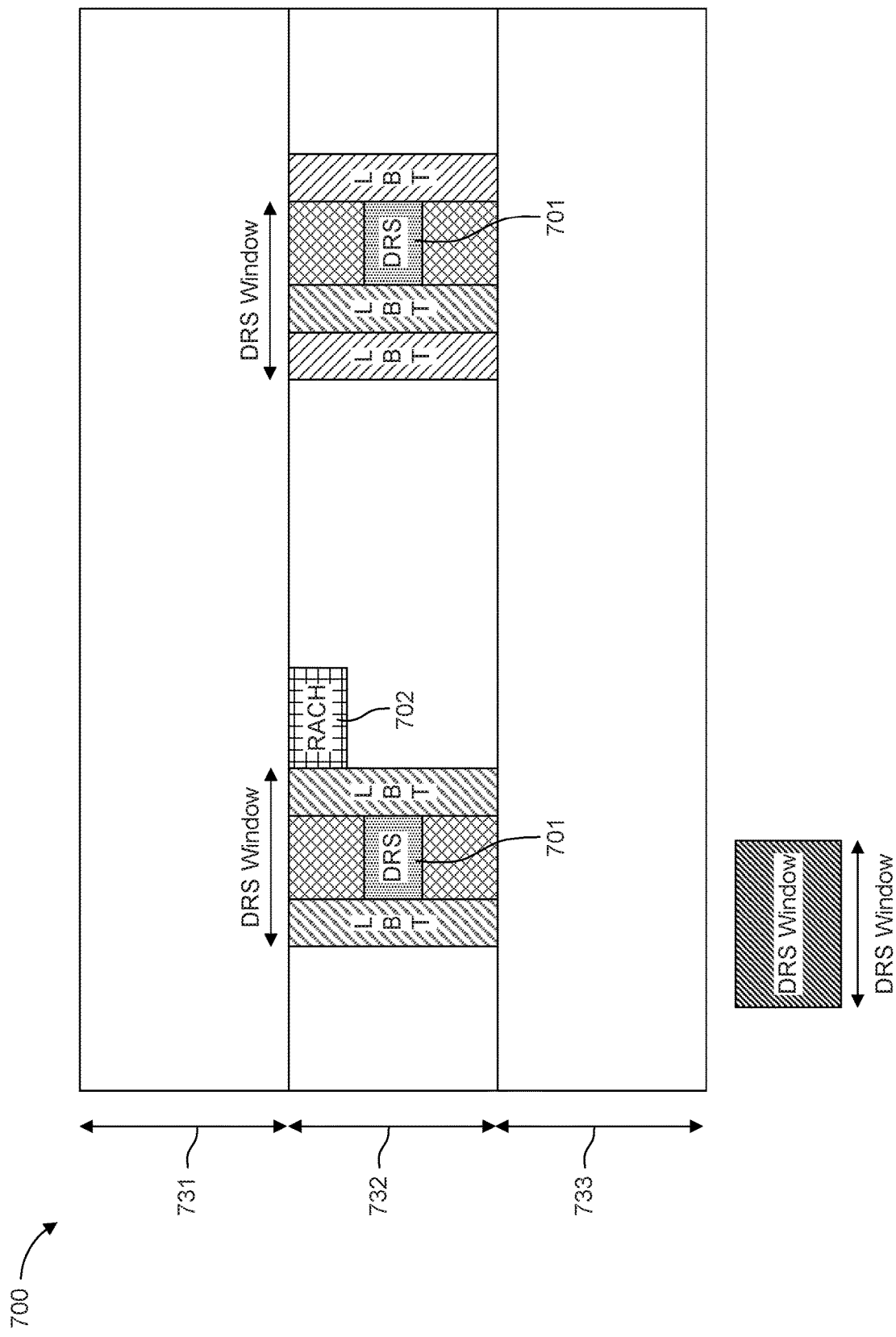
FIG. 7 is a diagram illustrating an example of an anchor subband.

FIG. 7 is a diagram 700 illustrating an anchor subband. In embodiments, the initial access signals (the DRS 701) may be transmitted on a primary or anchor subband 732 only (or anchor subband set). The WTRU may monitor the primary subband only and on receipt of the SS/PBCH and minimum system information, may perform a RACH procedure 702 on the anchor band 732 only. Additionally or alternatively, the WTRU may monitor the primary subband only and on receipt of the SS/PBCH and minimum system information, may perform a random-access procedure on any other subband 731-733 that it is able to successfully perform a LBT on. The WTRU may use one of the wideband LBT methods discussed above.

Figure 8:
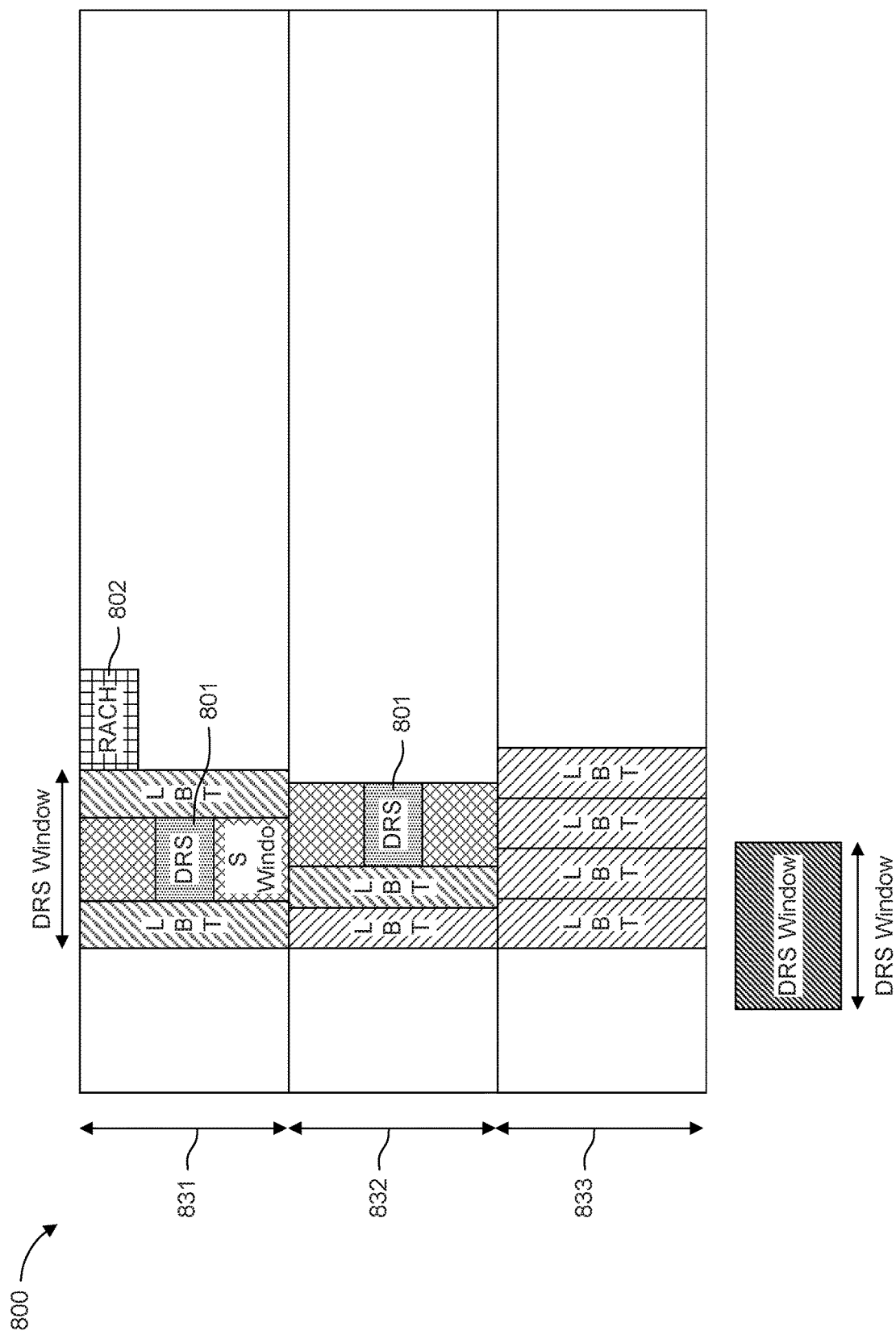
FIG. 8 is a diagram illustrating an example of an independent discovery reference signal (DRS) with physical random access channel (PRACH) on DRS subband.

FIG. 8 is a diagram 800 illustrating an independent DRS 801 with a physical random access channel (PRACH) 802 on a DRS subband. In embodiments, the initial access signals (e.g., the DRS 801) may be transmitted independently per LBT subband. The WTRU may monitor all of the LBT subbands 831-833 and on receipt of the SS/PBCH and minimum system information on one or more of the subbands, may perform a random-access procedure on the received subband(s) 831 only. The WTRU may use one of the wideband LBT methods discussed above. Note that the WTRU may perform the PRACH 802 on a single subband or all the subbands it successfully receives the DRS 801 on. The WTRU may skip performing a PRACH or monitoring the DRS if it successfully received a DRS within a minimum duration or time-interval.

Figure 9:
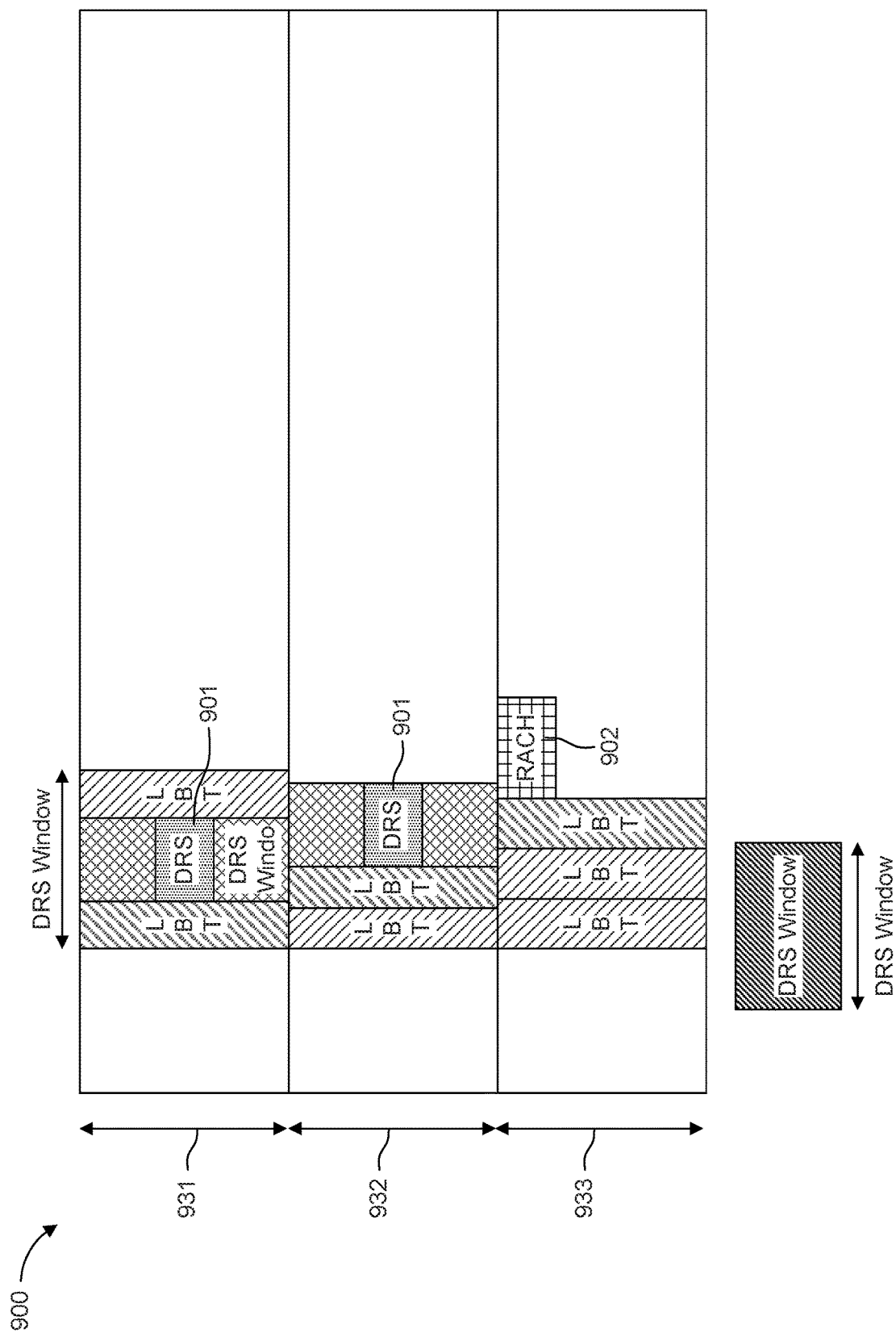
FIG. 9 is a diagram illustrating an example of an independent DRS with PRACH on any subband.

FIG. 9 is a diagram 900 illustrating an independent DRS 901 with PRACH 902 on any subband. The WTRU may monitor all the LBT subbands 931-933 and on receipt of the SS/PBCH and minimum system information on one or more of the subbands, may perform a random-access procedure on any band that is able to successfully perform a LBT on. In the example illustrated in FIG. 9, RACH 902 is performed on subband 933, as it is able to successfully perform a LBT.

FIG. 10 is a diagram 1000 illustrating a joint DRS 1001 with PRACH 1002 on any subband. In embodiments, the initial access signals (e.g., the DRS 1001) may be transmitted concurrently on all the LBT subbands that have been acquired. In the example illustrated in FIG. 10, the gNB may attempt LBTs on all of the subbands 1031-1033 (e.g., a hierarchical LBT) and on acquisition of a subband, may transmit a dummy signal 1003 to reserve the subband 1031. At a pre-determined time, the gNB may transmit DRS signals on all the acquired subbands 1031, 1032.

In embodiments, the WTRU may monitor all the LBT subbands and on receipt of the SS/PBCH and minimum system information on one or more of the subbands, may perform a RACH on the received subband(s) 1033 only. The WTRU may use one of the wideband LBT methods discussed above. Note that the WTRU may perform the RACH 1002 on a single subband or all the subbands it successfully receives the DRS on. The WTRU may skip performing a PRACH or monitoring the DRS if it successfully received a DRS within a minimum duration or time-interval.

In embodiments, the WTRU may monitor all the LBT subbands and on receipt of the SS/PBCH and minimum system information on one or more of the subbands, may perform a random-access procedure on any band that is able to successfully perform a LBT on.

Note that there may be a QCL relationship defined between the DRS transmissions on the different subbands to enable acquisition on one subband to be applicable to another.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method of acquiring available resources, the method comprising:
    performing a first listen before talk (LBT) procedure, wherein the first LBT is performed on an entire bandwidth part (BWP);
    on a condition that the first LBT procedure is successful and the entire BWP is acquired, transmitting on the acquired BWP;
    on a condition that the first LBT procedure is not successful and the entire BWP is not acquired, performing a second LBT procedure on one or more subband sets which include less subband sets than the entire BWP;
    on a condition the second LBT procedure is successful and the one or more subband sets are acquired, transmitting on the one or more subband sets;
    on a condition that the second LBT procedure is not successful and the one or more subband sets are not acquired, performing a third LBT procedure on one or more subbands, which include less subbands than the one or more subbands sets; and
    on a condition that the third LBT procedure is successful and the one or more subbands are acquired,
    and
    transmitting, on the one or more subbands, during a shared channel occupancy time, an indication of the one or more acquired subbands.

2. The method of claim 1, wherein the one or more subband sets are determined by at least one of previous LBT operation, network configuration, measurements, and transmission type.

3. The method of claim 1, wherein the performing a second LBT procedure on one or more subband sets includes adjusting at least one LBT parameter.

4. The method of claim 3, wherein the at least one LBT parameter is a number of idle clear channel assessment (CCA) slots required.

5. The method of claim 1, further comprising monitoring multiple LBT subbands for a discovery reference signal (DRS) and transmitting a physical random access channel (PRACH) on an acquired LBT subband.

6. The method of claim 1, wherein a stopping criterion for the performing the second LBT procedure on the one or more subband sets is acquiring a sufficient number of subband sets or acquiring a largest possible contiguous group of subband sets.

7. The method of claim 1, wherein a stopping criterion for the performing the third LBT on the one or more subbands is acquiring a sufficient number of subbands.

8. The method of claim 1, wherein the performing the first LBT procedure on the entire BWP is category 4 LBT.

9. The method of claim 8, wherein the performing the second LBT procedure on the one or more subband sets and the performing the third LBT procedure with respect to one or more all subbands is category 4 LBT.

10. The method of claim 8, wherein the performing the second LBT procedure on the one or more subband sets and the performing the third LBT procedure with respect to one or more all subbands is category 2 LBT.

11. A wireless transmit receive unit (WTRU) comprising:
    a memory;
    a transceiver; and
    a processor, wherein the processor and the transceiver are configured to:
    perform a first LBT procedure with respect to available resources on an entire bandwidth part (BWP),
    on a condition that the first LBT procedure is not successful and the entire BWP is not acquired, perform a second LBT procedure on one or more subband sets, which include less subband sets than the entire BWP,
    on a condition that the second LBT procedure is not successful and the one or more subband sets are not acquired, perform a third LBT procedure on one or more subbands, which include less subbands than the one or more subband sets, and
    on a condition that the third LBT procedure is successful and the one or more subbands are acquired, and
    transmit, on the one or more subbands, during a shared channel occupancy time, an indication of the one or more acquired subbands.

12. The WTRU of claim 11, wherein the WTRU is further configured with a stopping criterion for the performing the first LBT procedure with respect to the entire BWP, the stopping criterion being acquiring the entire BWP in an allocated time.

13. The WTRU of claim 11, wherein the WTRU is further configured with a stopping criterion for the performing the second LBT procedure with respect to the one or more subband sets, the stopping criterion being acquiring a sufficient number of subband sets or acquiring a largest possible contiguous group of subband sets.

14. The WTRU of claim 11, wherein the WTRU is further configured with a stopping criterion for the performing the third LBT procedure with respect to the one or more subbands, the stopping criterion being acquiring a sufficient number of subbands.

15. The WTRU of claim 11, wherein the subbands are at least 20 MHz.

* * * * *